(12) United States Patent
Minelly et al.

(10) Patent No.: US 7,570,856 B1
(45) Date of Patent: Aug. 4, 2009

(54) APPARATUS AND METHOD FOR AN ERBIUM-DOPED FIBER FOR HIGH PEAK-POWER APPLICATIONS

(75) Inventors: John D. Minelly, Bothell, WA (US); Anping Liu, Big Flats, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/567,740

(22) Filed: Dec. 7, 2006

Related U.S. Application Data

(60) Provisional application No. 60/748,379, filed on Dec. 7, 2005.

(51) Int. Cl.
*G02B 6/036* (2006.01)
(52) U.S. Cl. .................. 385/126; 385/124; 385/127; 385/128
(58) Field of Classification Search .............. None
See application file for complete search history.

(56) References Cited

U.S. PATENT DOCUMENTS

| | | | |
|---|---|---|---|
| 4,009,014 A | | 2/1977 | Black et al. |
| 4,372,648 A | | 2/1983 | Black |
| 4,447,124 A | | 5/1984 | Cohen |
| 4,723,828 A | | 2/1988 | Garel-Jones et al. |
| 5,121,460 A | | 6/1992 | Tumminelli et al. |
| 5,261,016 A | | 11/1993 | Poole |
| 5,361,319 A | * | 11/1994 | Antos et al. ............ 385/123 |
| 5,790,735 A | | 8/1998 | Oleskevich et al. |
| 5,818,630 A | | 10/1998 | Fermann et al. |
| 5,828,802 A | | 10/1998 | Stolen et al. |
| 5,926,600 A | | 7/1999 | Pavlath |
| 6,327,403 B1 | | 12/2001 | Danzinger et al. |
| 6,434,311 B1 | | 8/2002 | Danzinger et al. |
| 6,496,301 B1 | | 12/2002 | Koplow et al. |
| 6,603,791 B2 | | 8/2003 | Goldberg et al. |

(Continued)

OTHER PUBLICATIONS

Gloge, D., et al., "GaAs Twin-Laser Setup to Measure Mode and Material Dispersion in Optical Fibers", "Applied Optics", Feb. 1974, pp. 261-263, vol. 13, No. 2.

(Continued)

*Primary Examiner*—Uyen Chau N Le
*Assistant Examiner*—Chad H Smith
(74) *Attorney, Agent, or Firm*—Charles A. Lemaire; Lemaire Patent Law Firm, P.L.L.C.

(57) ABSTRACT

A method and apparatus using a gain medium in the form of a multiply clad gain fiber having an erbium-doped core. In some embodiments, aluminum and germanium are added to the silica core to make $\lambda_0$ longer than the signal wavelength so the signal incurs normal dispersion. Optionally, a large-mode-area core amplifies primarily only one low-order mode because its NA is reduced by lowering the core's index of refraction (e.g., by adding fluorine) and/or by raising the index of the silica inner core (e.g., by adding germanium). Optionally, a thulium-doped region provides substantial loss at the first Raman-gain peak with respect to the signal wavelength but minimal loss at the signal or pump wavelength. Optionally, an inner cladding with a higher NA contains pump light within the outer boundaries of the cladding while allowing pump light to enter the core. In some embodiments, a triple cladding is provided.

22 Claims, 7 Drawing Sheets

U.S. PATENT DOCUMENTS

| | | | |
|---|---|---|---|
| 6,614,975 | B2 | 9/2003 | Richardson et al. |
| 6,640,031 | B2 | 10/2003 | Dong et al. |
| 6,711,918 | B1 | 3/2004 | Kliner et al. |
| 6,731,837 | B2 | 5/2004 | Goldberg et al. |
| 6,778,782 | B1 | 8/2004 | Watley et al. |
| 6,825,974 | B2 | 11/2004 | Kliner et al. |
| 6,836,607 | B2 | 12/2004 | Dejneka et al. |
| 6,959,022 | B2 | 10/2005 | Sandrock et al. |
| 6,985,660 | B2 | 1/2006 | Koshiba et al. |
| 2002/0076153 | A1* | 6/2002 | Hollister et al. ............... 385/36 |
| 2002/0090184 | A1* | 7/2002 | Sayag ......................... 385/120 |
| 2002/0114600 | A1* | 8/2002 | Aiso et al. ................... 385/123 |
| 2002/0167717 | A1* | 11/2002 | Masuda et al. ........... 359/341.1 |
| 2002/0172486 | A1* | 11/2002 | Fermann ..................... 385/128 |
| 2003/0002834 | A1* | 1/2003 | Brown et al. ................ 385/123 |
| 2003/0053773 | A1* | 3/2003 | Ainslie et al. ............... 385/123 |
| 2005/0158006 | A1* | 7/2005 | Koh et al. .................... 385/143 |

OTHER PUBLICATIONS

Luther-Davies B., et al., "Evaluation of Material Dispersion in Low Loss Phosphosilicate Core Optical Fibres", "Optics Communications", Jan. 1975, pp. 84-88, vol. 13, No. 1.

Minelly, J.D., et al., "Efficient Cladding Pumping of an Er3+ Fibre", "Proc. 21st Eur. Conf. on Opt. Comm, ECOC 1995", 1995, pp. 917-920.

Wang, Zi Hua, et al., "Analysis of the Absorption Efficiency of Graded-Index Double-Clad Fiber", "Proceedings of SPIE", 2005, pp. 821-829, vol. 5623.

Adams, M. J., et al., "Wavelength-Dispersive Properties of Glasses for Optical Fibres: the Germania Enigma", "Electronic Letters", Oct. 26, 1978, pp. 703-705, vol. 14, No. 22.

Lushnikov, P.M., "Dispersion-Managed Soliton in Optical Fibers with Zero Average Dispersion", "Optics Letters", Aug. 15, 2000, pp. 1144-1146, vol. 25, No. 16.

Payne, D. N., et al., "Zero Material Dispersion in Optical Fibres", "Electronics Letters", Apr. 17, 1975, vol. 11, No. 8.

Peddanarappagari, K. V., et al., "Study of Fiber Nonlinearities in Communication Systems Using a Volterra Series Transfer Function Approach", "Proceedings of the 31st Annual Conference on Information Sciences and Systems (CISS)", Mar. 1997.

Peddanarappagari, K. V., et al., "Design of Fiber Amplifier Based Communications Systems Using a Volterra Series Approach", "Proceedings of the 10th Annual Meeting of the IEEE Lasers and Electro-Optics Society (LEOS)", Nov. 1997, pp. 228-229, vol. 1.

* cited by examiner

APPARATUS AND METHOD FOR AN ERBIUM-DOPED FIBER FOR HIGH PEAK-POWER APPLICATIONS

RELATED APPLICATIONS

This application claims benefit to U.S. Provisional Patent Application 60/748,379 titled "APPARATUS AND METHOD FOR AN ERBIUM-DOPED FIBER FOR HIGH-PEAK-POWER APPLICATIONS", filed Dec. 7, 2005, which is incorporated by reference in its entirety.

FIELD OF THE INVENTION

The invention relates to fiber lasers and amplifiers, and more particularly to optical-fiber gain media having a doping concentration of the active laser species such as erbium and/or ytterbium, and normal dispersion rather than anomalous dispersion, in order to provide higher optical-power output.

BACKGROUND OF THE INVENTION

Fiber lasers are typically lasers with optical fibers as gain media, although some lasers with a semiconductor gain medium and a fiber cavity have also been called fiber lasers. In most cases, the gain medium is a fiber doped with rare-earth ions such as erbium, neodymium, ytterbium, or thulium, and one or several laser diodes are used for pumping. Some benefits associated with fiber lasers include: a large gain bandwidth due to strongly broadened laser transitions in glasses, enabling wide wavelength tuning ranges and/or the generation of ultra-short pulses, the potential for very high output powers (e.g., several kilowatts with double-clad fibers) due to a high surface-to-volume ratio (avoiding excessive heating) and the guiding effect, which avoids thermo-optical problems even under conditions of significant heating, just to name a few.

Additional benefits can accrue in fiber lasers that have modified gain medium or, in the case of a fiber laser, a modified gain fiber. As described above, fiber lasers often contain certain glass modifiers such as aluminum, phosphorous, germanium or tantalum, as well as active elements such as trivalent rare-earth ions including neodymium, ytterbium, thulium or erbium. These fibers are optically pumped. The doping densities of active ions and glass modifiers often have to be carefully optimized. A high doping density may be desirable for good pump absorption in a short length, but may lead to energy losses related to quenching processes (e.g., caused by clustering of laser-active ions and energy transport to defects).

In addition to doping the density of a gain fiber, additional energy can be generated by addressing issues related to the refractive index of the core and the cladding material. More to the point, the energy generated by a fiber laser is also dependent upon the various refractive values and the model index values associated with a particular gain fiber configuration. In some configurations, a gain fiber will be configured such that its refractive index is a step index value. The step index fiber is the simplest case of a standard gain fiber.

Despite the benefits associated with fiber lasers, there are problems associated with these types of lasers. For example, complicated temperature-dependent polarization evolution, the various nonlinear effects of which often limit the performance, and risk of fiber damage at high powers (commonly known as "fiber fuse"). When fiber fuse occurs, the fiber can burn down starting from the output end and propagating back towards the input end.

The problems of temperature-dependent polarization and fiber fuse become even more acute, given the current and proposed uses of fiber lasers. As described above, fiber lasers can be used to produce very high output powers. Given these high output powers, fiber lasers have uses for military and industrial applications requiring large amounts of energy.

There has been much recent interest in high-peak-power fiber lasers and amplifiers operating in the eye-safe region around 1.55 microns ($\mu m$) for applications such as ranging and imaging. The performance of these devices is often limited by nonlinear effects, such as modulation-instability-driven four-wave mixing. This has been a problem both in ErYb phospho-silicate fibers and conventional large-mode-area (LMA) erbium fibers. Peak-power scaling is limited by the shedding of energy into a super-continuum which broadens beyond the erbium gain bandwidth. Accordingly, it is necessary to develop methods and apparatus to enable one to use high energy in conjunction with fiber lasers, but at the same time avoid the aforementioned problems of, for example, four-wave mixing.

SUMMARY OF THE INVENTION

A method and apparatus using a gain medium in the form of a double-clad gain fiber having an erbium-doped core is described. In some embodiments, aluminum and germanium are added to the silica core to lengthen the wavelength of the first Raman-gain peak (lambda0) with respect to the signal wavelength in order that the signal in the core incurs normal dispersion. In some embodiments, a large-mode-area core is provided that amplifies substantially only one low-order mode because the core's numerical aperture is reduced by lowering the index of the core (e.g., by adding a dopant such as fluorine) and/or by raising the index of the silica inner core (e.g., by doping with germanium). Some embodiments include a thulium-doped region (e.g., in the inner cladding) that provides substantial loss at the first Raman-gain peak with respect to the signal wavelength but minimal loss at the signal wavelength itself, and/or at the pump wavelength. Some embodiments include an inner cladding with a higher NA to contain pump light within the outer boundaries of the cladding while allowing pump light to enter the core. In some embodiments, a triple cladding is provided.

In some embodiments, the present invention utilizes a gain medium in the form of a gain fiber that has erbium doping in place of ErYb co-doping. Some embodiments provide an optical fiber amplifier for pulses in the 1.52-1.62 microns wavelength range, wherein the amplifier includes a gain section having a gain medium, and the fundamental mode experiences normal dispersion when passing through the gain medium.

In some embodiments, the gain section includes a multi-clad erbium fiber such as a double-clad fiber having at least a core, and inner cladding, and an outer cladding, or a triple-clad fiber having at least a core, an inner cladding, an outer cladding, and a cover cladding. In some embodiments, the multi-clad fiber is fabricated by raising the effective refractive index of the inner cladding. In some embodiments, the raised-index inner cladding is primarily germano-silicate. In some embodiments, the core is erbium doped and includes germanium and aluminum, and the erbium-doped core has its normal dispersion property dominated by concentrations of the germanium and the aluminum. In some embodiments, the inner-cladding refractive index profile approximates a step index. In some embodiments, the inner cladding refractive index has a graded profile. In some embodiments, the inner cladding also has a region doped with thulium for cladding-mode absorption. In some embodiments, the inner cladding has a numerical aperture in the range 0.15-0.35. In some embodiments, the core has a numerical aperture in the range 0.04 to 0.15. In some embodiments, the core and cladding refractive indexes vary in a continuous manner so that boundaries of the core and cladding regions are ill defined in a refractive index profile.

In some embodiments, the erbium ions are confined to a region in which the overlap with the LP01 or fundamental mode of the structure is in the range 60%-100%. In some embodiments, the inner-cladding waveguide is formed by lowering the outer cladding's refractive index. In some embodiments, the core has a numerical aperture in the range 0.15-0.25. In some embodiments, the numerical aperture and dispersion properties are dominated by the concentrations of germanium and aluminum in the core. In some embodiments, the cladding waveguide is formed by a fluorosilicate outer cladding. In some embodiments, the cladding waveguide is formed by a low-index polymer coating. In some embodiments, the gain section includes a triple-clad fiber.

Some embodiments further include a thulium-doped region that provides substantial loss at the first Raman-gain peak with respect to the signal wavelength but minimal loss at the signal wavelength itself. Some embodiments further include a thulium-doped region that provides substantial loss at the first Raman-gain peak with respect to the signal wavelength but minimal loss at the pump wavelength.

In some embodiments, the inner core region is co-doped with fluorine or boron to reduce the index of refraction. In some embodiments, the core has a step-like numerical aperture in the range 0.04 to 0.15. In some embodiments, the core is co-doped with boron or fluorine to restrict the index difference but still provide normal dispersion via the germania-alumino content.

In some embodiments, a group of dopants in the inner core ensure normal dispersion while additional dopants lower the refractive index difference by either raising the index of the cladding or lowering the index of the core without otherwise changing the sign of the LP01-mode dispersion.

DETAILED DESCRIPTION

Figure 1A:
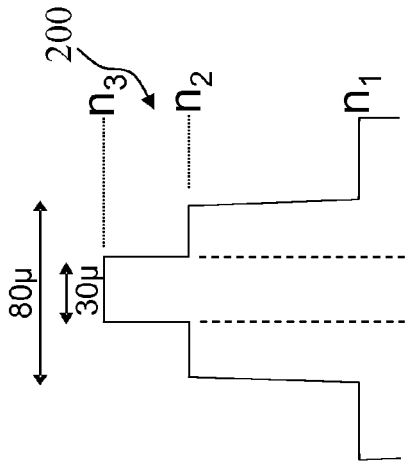
FIG. 1A is a schematic graph 100 of the index of refraction across a diameter of a fiber according to some embodiments of the present invention.

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, much higher peak powers are achieved in a conventional small-core erbium-doped fiber amplifier than in an ErYb co-doped fiber of similar waveguide parameters. The reason is related to the sign of the group velocity dispersion of the different types of fiber. It is well known that adding dopants such as germania and alumina to silica will increase the refractive index (see, e.g., Gloge et al., Applied Optics 13, pp 261, 1974 ("Gloge 1974")). Adding dopants such as a germania (e.g., $GeO_2$) and an alumina (e.g., $Al_2O_3$) to silica also leads to a red shift in the zero-dispersion wavelength. At the levels of germanium in a standard germano-alumino-silicate (i.e., a silicate fiber having germanium and aluminum) erbium-doped fiber, the group-velocity dispersion (GVD) is in the normal regime across the C-band (i.e., about 1520 nm to 1565 nm wavelength light).

Power scaling of erbium-doped fiber amplifiers (EDFAs) is usually achieved in an energy transfer pumped ErYb fiber. Efficient energy transfer has to date only been achieved in phospho-silicate glass. However, phospho-silicate has similar material dispersion to fused silica even at the high doping levels necessary for energy transfer (see, e.g., Luther-Davies et al, "Evaluation of Material Dispersion in low-loss phosphosilicate fibers" *Optics Communications* 13, 1, pp 84-88, 1975 ("Luther-Davies 1975")). Consequently, pulsed amplifiers based on ErYb are limited in peak power by the onset of modulation instability and the gain-reducing spectral broadening that occurs.

In some embodiments, the present invention provides Yb-free large-mode-area (LMA) erbium fibers as a way of reaching higher peak power. In some embodiments, these fibers reduce the nonlinear threshold by enabling fibers of higher effective area while maintaining single-mode operation. However, when low levels of index-raising material are added to silica fibers, such fibers exhibit anomalous dispersion for high-intensity light having a wavelength of about 1550 nm. In order to shift the lambda-zero wavelength of nonlinear interactions to a longer wavelength, aluminum and/or germanium are added to the core, resulting in a high index of refraction in the core and this results in a high numeric aperture (NA) that permits several different modes to be supported in the core. The present invention reduces the NA of the core either by adding a material to the core that reduces its index of refraction or by adding a material to the inner cladding that raises its index of refraction. The lowered NA in the core of fibers constituting the present invention results in a single mode being supported in the core.

Chromatic dispersion is the frequency dependence of the phase velocity with which light propagates in a medium. As described at www.rp-photonics.com/dispersion.html, the Taylor expansion of the wavenumber k (where $k=2\pi/\lambda$) as a function of angular frequency $\omega$ (around some center frequency $\omega_0$, e.g., the mean frequency of some laser pulses):

$$k(\omega) = k_0 + \frac{\partial k}{\partial \omega}(\omega - \omega_0) + \frac{1}{2}\frac{\partial^2 k}{\partial \omega^2}(\omega - \omega_0)^2 + \frac{1}{6}\frac{\partial^3 k}{\partial \omega^3}(\omega - \omega_0)^3 + ...$$

where the terms corresponding to the different orders have the following meaning:

The zero-order term $k_0$ describes a common phase shift.

The first-order term contains the inverse group velocity and describes an overall time delay without an effect on the pulse shape:

$$k' \equiv \frac{\partial k}{\partial \omega} = \frac{1}{v_g}$$

The second-order term contains the second-order dispersion (group-delay dispersion per unit length):

$$k'' \equiv \frac{\partial^2 k}{\partial \omega^2}$$

The third-order term contains the third-order dispersion (TOD) per unit length:

$$k''' \equiv \frac{\partial^3 k}{\partial \omega^3}$$

Second-order dispersion is often specified in units of $s^2/m$. It is basically the derivative of the inverse group velocity with respect to angular frequency:

$$k' \equiv \frac{\partial k}{\partial \omega} = \frac{1}{v_g} \rightarrow k'' \equiv \frac{\partial k}{\partial \omega}\left(\frac{1}{v_g}\right)$$

One distinguishes "normal dispersion" (for which $k''>0$) and "anomalous dispersion" (for which $k''<0$). Normal dispersion, where the group velocity decreases with increasing optical frequency, occurs for most transparent media in the visible spectral region. Anomalous dispersion sometimes occurs at longer wavelengths, e.g., in silica (the basis of most optical fibers) beyond about 1.3 µm (microns). Great care is recommended when the sign of dispersion is specified, because the ultrafast optics community identifies this with the sign of k", while the opposite sign is usually used in fiber optics, where the dispersion is often specified with the parameter $$D_\lambda == \frac{2\pi c}{\lambda^2}\frac{\partial^2 k}{\partial \omega^2}$$

which is normally given in units of ps/(nm km) (picoseconds per nanometer and kilometer). The different signs result from using a frequency derivative in one case and a wavelength derivative in the other case. Note also that the conversion factor depends on the wavelength. Between wavelength regions with normal and anomalous dispersion, there is a zero-dispersion wavelength (i.e., lambda$_0$ or $\lambda_0$).

The present invention presents a number of double-clad and triple-clad fiber structures compatible with pumping with broad-area diode lasers with both an LMA core design and normal dispersion for the fundamental mode. In some embodiments, the apparatus and methods are used to amplify signal pulses, while in other embodiments, a continuous-wave (cw) signal is amplified.

Figure 1B:
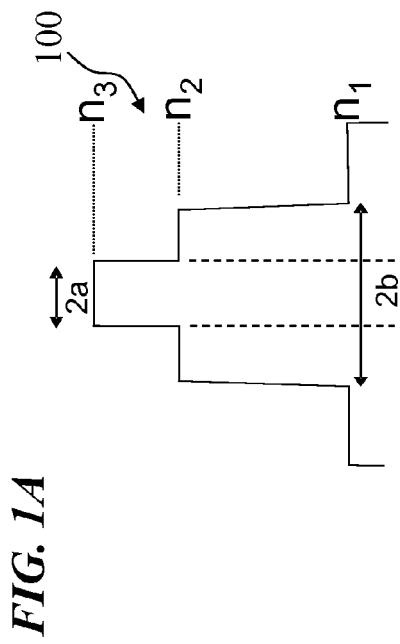
FIG. 1B is a schematic cross-section diagram across a fiber 101 corresponding to the index profile graph of FIG. 1A according to some embodiments of the present invention.

FIG. 1A and FIG. 1B show an embodiment that is an improvement, but in some ways similar to that previously proposed by Minelly et al. (Minelly et al, "Efficient cladding pumping of an erbium fiber", ECOC 95). The present improvement includes modifications for high-peak-power operation and options for enhanced pump absorption, cladding-mode suppression and higher-order-mode leakage. FIG. 1A shows a refractive index profile 100 and FIG. 1B shows a cross-section of the basic structure of a dispersion-optimized double-clad fiber 101, according to some embodiments of the present invention.

FIG. 1A is a schematic graph 100 of the index of refraction (also called a refractive index profile 100) across a diameter of a dispersion-optimized double-clad fiber 101 according to some embodiments of the present invention. FIG. 1B is a schematic cross-section diagram across fiber 101 corresponding to the index profile graph of FIG. 1A according to some embodiments of the present invention. In some embodiments, an inner core 111 has a relatively high index of refraction $n_3$, a relatively low NA, and dispersion optimization. In some embodiments, the core 111 is in the center of the inner cladding 112 as shown, while in other embodiments, the core is off to a side in order that the pump light reflecting around the periphery of the inner cladding 112 will intercept into the core. An outer cladding 119 helps contain the pump light inside the inner cladding 112 (and into the core 111).

Figure 2A:
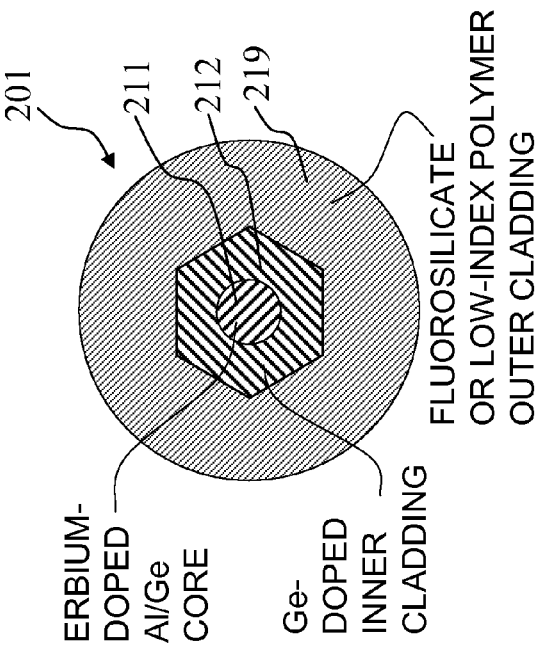
FIG. 2A is a schematic graph 200 of the index of refraction across a diameter of a fiber according to some embodiments of the present invention.
Figure 2B:
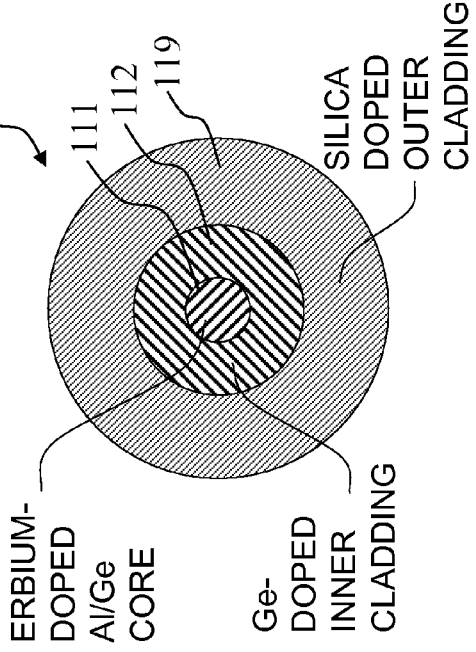
FIG. 2B is a schematic cross-section diagram of a fiber 201 corresponding to the index profile graph of FIG. 2A according to some embodiments of the present invention.

FIG. 2A is a schematic graph 200 of the index of refraction across a diameter of a fiber 201, according to some embodiments of the present invention. FIG. 2B is a schematic cross-section diagram of a fiber 201 corresponding to the index profile graph of FIG. 2A. This fiber is similar to that of FIGS. 1A and 1B, except that the cross-section of inner cladding 212 is polygonal in shape (e.g., a hexagon, in some embodiments, while other embodiments include different polygons such as a triangle, square, pentagon, heptagon, octagon, nonagon, decagon, and the like, as well as irregular shapes). In some embodiments, the core 211 is in the center of the inner cladding 212 as shown, while in other embodiments, the core is off to a side in order that the pump light reflecting around the periphery of the inner cladding 212 will intercept into the core. An outer cladding 219 helps contain the pump light inside the inner cladding 212 (and into the core 211).

FIG. 2A is a schematic graph 200 of the index of refraction across a diameter of a fiber 201 according to some embodiments of the present invention. FIG. 2B is a schematic cross-section diagram of a fiber 201 corresponding to the index profile graph of FIG. 2A according to some embodiments of the present invention.

In some embodiments, the difference between the core index of refraction (the core "index" $n_3$) and the index of refraction of the inner cladding (the inner cladding "index" $n_2$) is small, which means the numerical aperture (NA) of the core is made small, either by doping the core with a dopant (such as fluorine or boron) that lowers its index $n_4$ or by doping the inner cladding with a dopant that raises its index. This also means that only the light signal in the core (the core "mode") that has a direction substantially parallel to the axis of the core and the smallest angle of incidence with the core wall will continue to propagate in the core, while other modes having a larger angle of incidence with the core wall will exit the core. In contrast, in some embodiments, the difference between the inner core index $n_2$ and the outer core index $n_1$ is larger, meaning that a greater range of angles is permitted for the pump light, such that these larger angles will lead to the pump light impinging onto and into the core, providing the pump energy needed to amplify the core mode. Since, in some embodiments, it is intended that the signal wavelengths of light that are not in the primary core mode are to exit the core into the inner cladding, some embodiments include an area of absorption dopant material (such as thulium for signal wavelengths in the 1.55-micron range) that is provided in the inner cladding or outer core to suppress amplification of those signals, such as shown in FIGS. 4A/4B, 5A/5B, 6A/6B, 7A/7B, 8A/8B, 9A/9B, 10A/10B, 11A/11B, and 12A/12B.

Figure 3A:
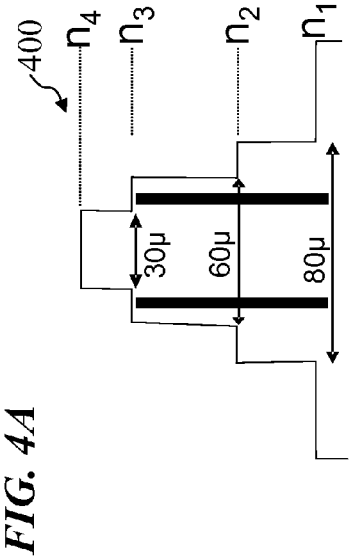
FIG. 3A is a schematic graph 300 of the index of refraction across a diameter of a fiber according to some embodiments of the present invention.
Figure 3B:
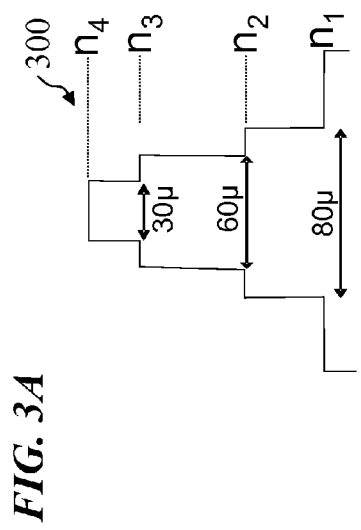
FIG. 3B is a schematic cross-section diagram of a fiber 301 corresponding to the index profile graph of FIG. 3A according to some embodiments of the present invention.
Figures 5A, 5B, 6A, 6B:
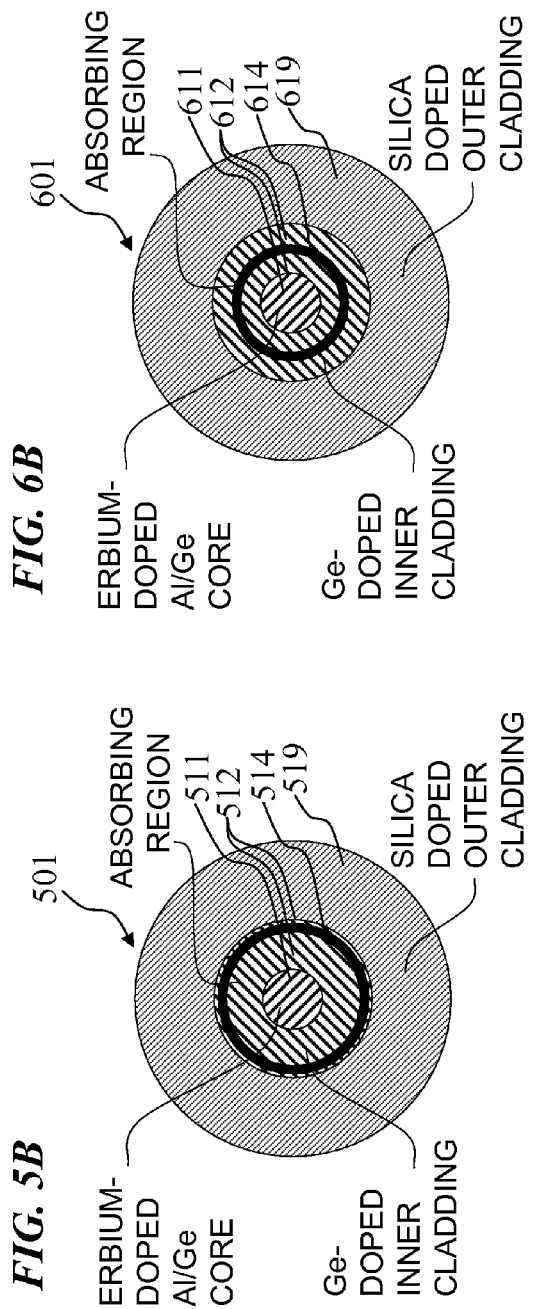
FIG. 5A is a schematic graph 500 of the index of refraction across a diameter of a fiber according to some embodiments of the present invention.
FIG. 5B is a schematic cross-section diagram of a fiber 501 corresponding to the index profile graph of FIG. 5A according to some embodiments of the present invention.
FIG. 6A is a schematic graph 600 of the index of refraction across a diameter of a fiber according to some embodiments of the present invention.
FIG. 6B is a schematic cross-section diagram of a fiber 601 corresponding to the index profile graph of FIG. 6A according to some embodiments of the present invention.

Another embodiment that is shown in FIGS. 3A and 3B combines the approaches of the FIG. 2A/2B embodiment with those of embodiments shown in FIG. 1A/1B or FIG. 5A/5B. One advantage of this embodiment is that the inner cladding's NA is effectively increased while retaining both the dispersion advantage and ASE-suppression (amplified-spontaneous-emission suppression) advantage. The FIG. 3A/3B embodiment shows a triple-clad fiber with dispersion-optimized core with pedestal index profile (other embodiments include a graded index region with dopant confinement (not shown)).

Note that, like the triple-clad fiber of FIG. 3A/3B, in other embodiments (not shown), the double-clad profiles shown in any of FIGS. 1A/1B, 2A/2B, 4A/4B, 5A/5B, 6A/6B, 7A/7B, 8A/8B, 9A/9B, 10A/10B, 11A/11B, and 12A/12B or otherwise described herein are made as triple-clad fibers by covering the "outer" cladding shown with a "coating" cladding having an index of refraction $n_0$ that is lower than the index $n_1$ of the outer cladding shown or described.

Figure 4A:
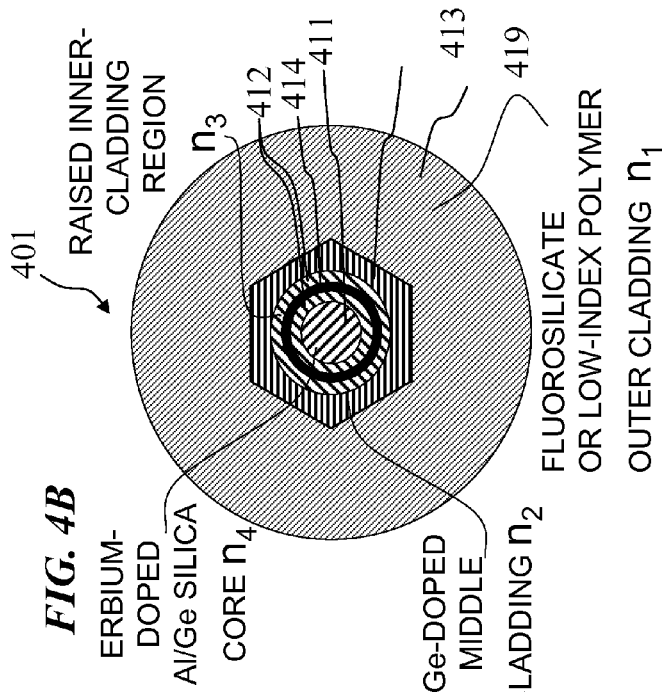
FIG. 4A is a schematic graph 400 of the index of refraction across a diameter of a fiber according to some embodiments of the present invention.
Figure 4B:
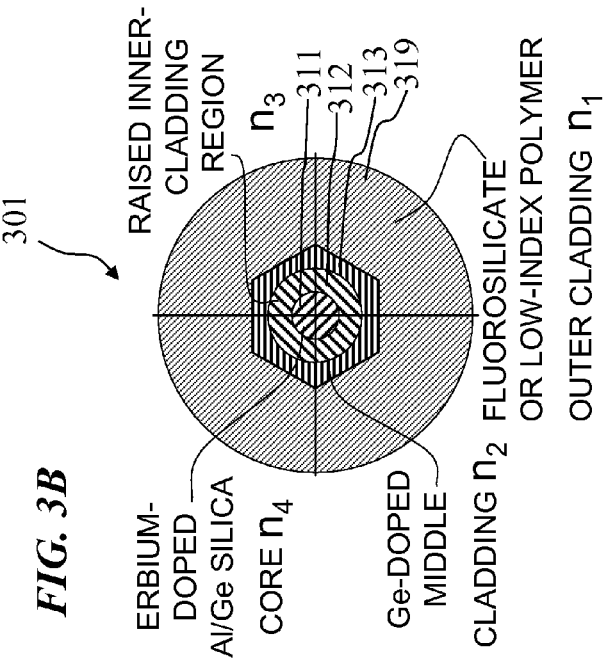
FIG. 4B is a schematic cross-section diagram of a fiber 401 corresponding to the index profile graph of FIG. 4A according to some embodiments of the present invention.

FIG. 4A is a schematic graph 400 of the index of refraction across a diameter of a fiber according to some embodiments of the present invention. FIG. 4B is a schematic cross-section diagram of a fiber 401 corresponding to the index profile graph of FIG. 4A according to some embodiments of the present invention. The embodiment of FIGS. 4A/4B is similar to that of FIGS. 3A/3B, except that an optional signal absorbing region (e.g., a lightly Tm-doped annulus 414) is located in the raised-index inner cladding 412, which surrounds core 411. In some embodiments, a low-index fluorosilicate or low-index polymer outer cladding 419 surrounds a Ge-doped middle cladding 413, to contain the pump light in the inner cladding 412 and erbium-doped Al/Ge core 411.

In some embodiments, the difference between the core index of refraction (the core "index" $n_4$) and the index of refraction of the inner cladding (the inner cladding "index" $n_3$) is made small (either by doping the core 411 with a dopant (such as fluorine or boron) that lowers its index $n_4$ or by doping the inner cladding 412 with a dopant that raises its index), which means the numerical aperture (NA) of the core is small. This also means that only the light signal in the core (the core "mode") that has a direction substantially parallel to the axis of the core and the smallest angle of incidence with the core wall will continue to propagate in the core, while other modes having a larger angle of incidence with the core wall will exit the core. In contrast, in some embodiments, the difference between the inner core index $n_3$ and the middle core index $n_2$ is larger, meaning that a greater range of angles is permitted for the pump light, such that these larger angles will lead to the pump light impinging onto and into the core, providing the pump energy needed to amplify the core mode.

Since, in some embodiments, it is intended that the signal wavelengths of light that are not in the primary core mode are to exit the core 411 into the inner cladding 412, some embodiments include an area of absorption dopant material 414 (such as thulium for signal wavelengths in the 1.55 micron range) is provided in the inner cladding 412 to suppress amplification of those signals, such as shown in FIGS. 4A/4B.

FIG. 5A is a schematic graph 500 of the index of refraction across a diameter of a fiber 501 according to some embodiments of the present invention. FIG. 5B is a schematic cross-section diagram of a fiber 501 corresponding to the index profile graph of FIG. 5A according to some embodiments of the present invention. FIG. 5A and FIG. 5B show the structure of FIGS. 1A and 1B, but with an optional cladding-mode-absorption annulus 514 added (in this case, near the outer diameter of inner cladding 512), and a graded index-of-refraction profile at the outside of the inner cladding 512 for pump-absorption enhancement (i.e., improved coupling of pump light from the inner cladding into the signal-amplification ions in the core). In some embodiments, graded-index Ge-doped inner cladding 512 has a clear demarcation with respect to the higher-index-of-refraction erbium-doped Al/Ge core 511. In some embodiments, a low-index Si-doped outer cladding 519 surrounds a graded-index Ge-doped inner cladding 512, to contain the pump light in the inner cladding 512 and erbium-doped Al/Ge core 511.

In some embodiments, the difference between the core index of refraction (the core "index" $n_3$) and the index of refraction of the inner cladding (the inner cladding "index" $n_2$) is made small (either by doping the core 511 with a dopant (such as fluorine of boron) that lowers its index $n_4$ or by doping the inner cladding 512 with a dopant that raises its index), which means the numerical aperture (NA) of the core is small. This also means that only the light signal in the core (the core "mode") that has a direction substantially parallel to the axis of the core and the smallest angle of incidence with the core wall will continue to propagate in the core, while other modes having a larger angle of incidence with the core wall will exit the core. This allows the core diameter and thus the core power to be made much larger than would otherwise be possible while keeping amplification in the core restricted to only the low-order mode. In contrast, in some embodiments, the difference between the inner core index $n_2$ and the outer core index $n_1$ is larger, meaning that a greater range of angles is permitted for the pump light, such that these larger angles will lead to the pump light impinging onto and into the core, providing the pump energy needed to amplify the core mode, while the larger NA keeps the pump light from exiting into the outer core 519. Since, in some embodiments, it is intended that the signal wavelengths of light that are not in the primary or lowest-order core mode are to exit the core 511 into the inner cladding 512, some embodiments include an area of absorption dopant material 514 (such as thulium for signal wavelengths in the 1.55 micron range) is provided in the inner cladding 512 to suppress amplification of those signals, such as shown in FIGS. 5A/5B.

Typical dimensions for the inner-core diameter $2a$ are in the range from about 10 to about 50 μm and for the inner-cladding diameter $2b$ in the range from about 20 to about 200 μm. In some embodiments, practical values for the core NA= $(n_3-n_2)^2$ are between 0.05 and 0.15 and for the cladding NA, between 0.15 and 0.25. These values assume that the fibers are fabricated by some kind of chemical-deposition process. If multi-component melted glasses are used, then the useful range of cladding NA could be increased to nearly 0.8. In some embodiments, refinements are made to this structure by doping at least a portion of the inner cladding with a signal-absorbent material such as Tm (to suppress signal amplification in the inner cladding) or by grading the inner cladding to enhance the pump absorption. Some aspects of these refinements have been discussed elsewhere (see, e.g., Dejneka et al, U.S. Pat. No. 6,836,607, incorporated herein by reference, and Wang, Zi H.; Xu, Sheng, "Analysis of the absorption efficiency of graded-index double-clad fiber", Nanofabrication: Technologies, Devices, and Applications. Edited by Lai, Warren Y.; Pau, Stanley; Lopez, O. Daniel, Proceedings of the SPIE, Volume 5623, pp. 821-829 (2005)), but such refinements have not been used in a dispersion-tailored profile.

Figure 10A:
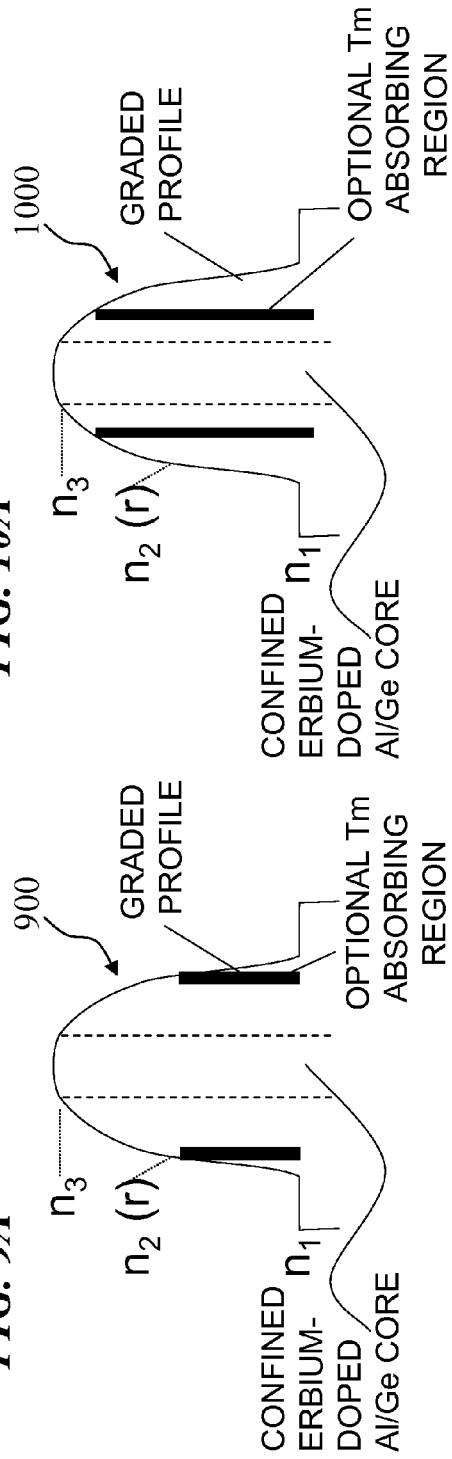
FIG. 10A is a schematic graph 1000 of the index of refraction across a diameter of a fiber according to some embodiments of the present invention.
Figure 10B:
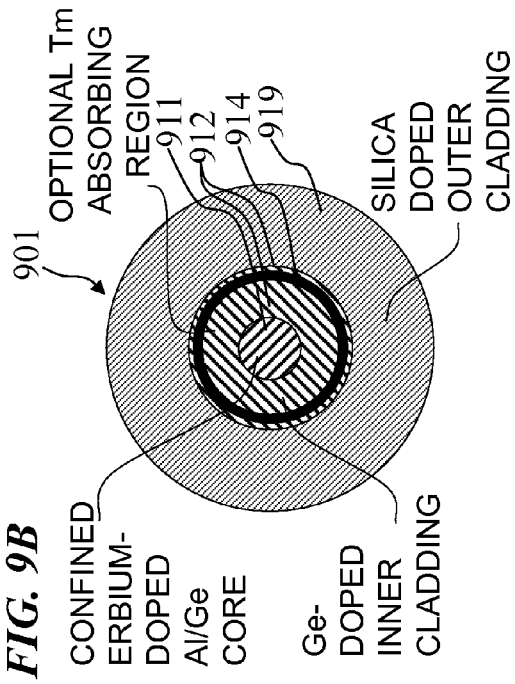
FIG. 10B is a schematic cross-section diagram of a fiber 1001 corresponding to the index profile graph of FIG. 10A according to some embodiments of the present invention.

Another embodiment that is shown in FIG. 10A and FIG. 10B (described below) is similar to that of FIG. 1A and FIG. 1B, but has no clear demarcation of core and inner cladding. A graded profile of sufficient index contrast and spatial extent for pump collection has a confined dopant (for signal amplification) substantially covering the region occupied by the structure's lowest order mode at the signal wavelength. The embodiment of FIGS. 10A/10B shows a dispersion-optimized structure for use as a high-peak-power amplifier but where there is no clear demarcation of core and cladding waveguides.

The embodiment that is shown in FIGS. 2A and 2B has a high-NA (numerical aperture) multimode core with sufficient up-doping to shift the dispersion but a small-enough diameter to maintain good beam quality. In some embodiments, this structure has an inner cladding 212 (which functions to carry pump light down the length of the fiber, where the pump light is reflected and kept within the inner cladding's outer surface by having its index $n_2$ larger than the index $n_1$ of the outer cladding, but which is intended to enter the core 211 since the inner cladding's index $n_2$ is smaller than the index $n_3$ of the core). In some embodiments, the inner cladding has a hexagonal outer shape (or other polygon), in order to reduce the amount of light reflecting around the inner cladding but not intercepting and entering the core 211. In some embodiments, this structure has a conventional secondary cladding including either a fluoro-silicate layer or a low-index-of-refraction polymer coating. This shows a high-NA LMA (high numerical aperture with a large mode area) core with depressed outer cladding to form pump waveguide. The core composition and NA is high enough to ensure normal dispersion at the signal wavelength.

FIG. 6A is a schematic graph 600 of the index of refraction across a diameter of a fiber 601 according to some embodiments of the present invention. FIG. 6B is a schematic cross-section diagram of a fiber 601 corresponding to the index profile graph of FIG. 6A according to some embodiments of the present invention. The embodiment of FIGS. 6A/6B is similar to that of FIGS. 5A/5B, except that the optional signal absorbing region (e.g., a Tm-doped annulus 614) is located near the middle of graded-index Ge-doped inner cladding 612, which has a clear demarcation with respect to the higher-index-of-refraction erbium-doped Al/Ge core 611. In some embodiments, a low-index Si-doped outer cladding 619 surrounds a graded-index Ge-doped inner cladding 612, to contain the pump light in the inner cladding 612 and erbium-doped Al/Ge core 611.

Figure 7A:
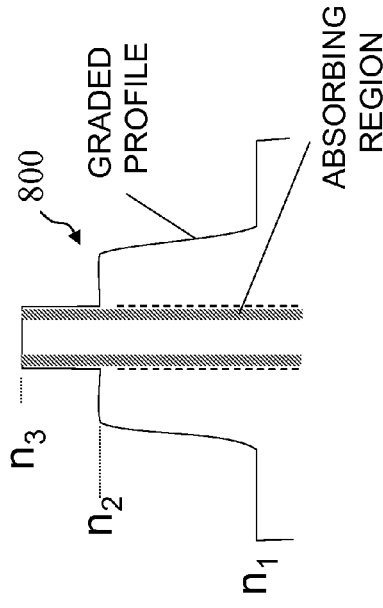
FIG. 7A is a schematic graph 700 of the index of refraction across a diameter of a fiber according to some embodiments of the present invention.
Figure 7B:
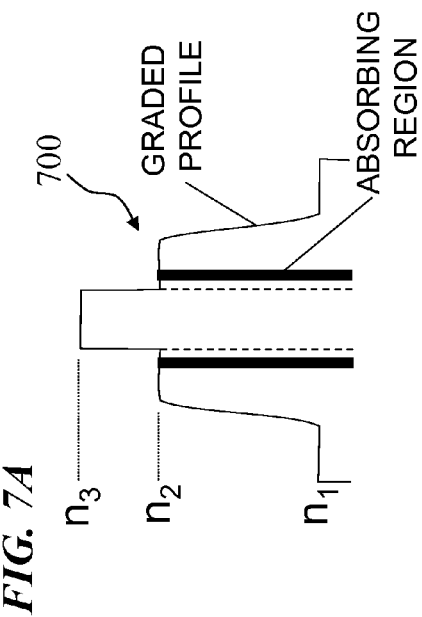
FIG. 7B is a schematic cross-section diagram of a fiber 701 corresponding to the index profile graph of FIG. 7A according to some embodiments of the present invention.

FIG. 7A is a schematic graph 700 of the index of refraction across a diameter of a fiber 701 according to some embodiments of the present invention. FIG. 7B is a schematic cross-section diagram of a fiber 701 corresponding to the index profile graph of FIG. 7A according to some embodiments of the present invention. The embodiment of FIGS. 7A/7B is similar to that of FIGS. 5A/5B, except that the optional signal absorbing region (e.g., a Tm-doped annulus 714) is located at or near the inner diameter of graded-index Ge-doped inner cladding 712, which has a clear demarcation with respect to the higher-index-of-refraction erbium-doped Al/Ge core 711. In some embodiments, a low-index Si-doped outer cladding 719 surrounds a graded-index Ge-doped inner cladding 712, to contain the pump light in the inner cladding 712 and erbium-doped Al/Ge core 711.

Figure 8A:
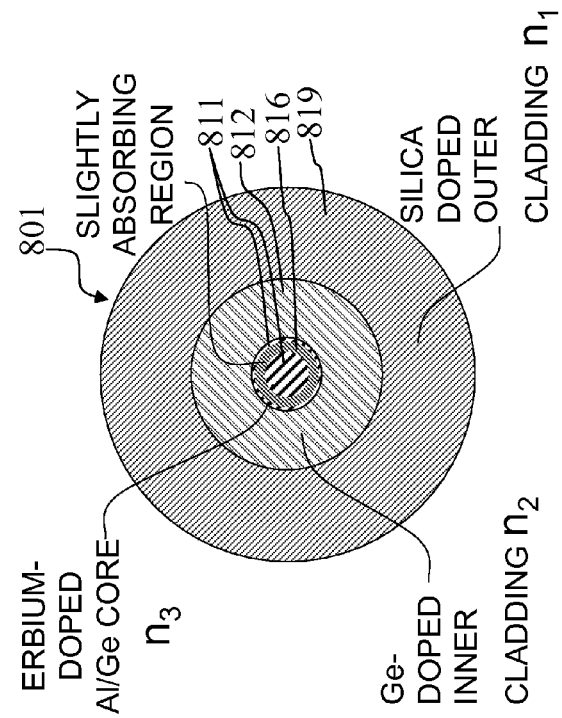
FIG. 8A is a schematic graph 800 of the index of refraction across a diameter of a fiber according to some embodiments of the present invention.
Figure 8B:
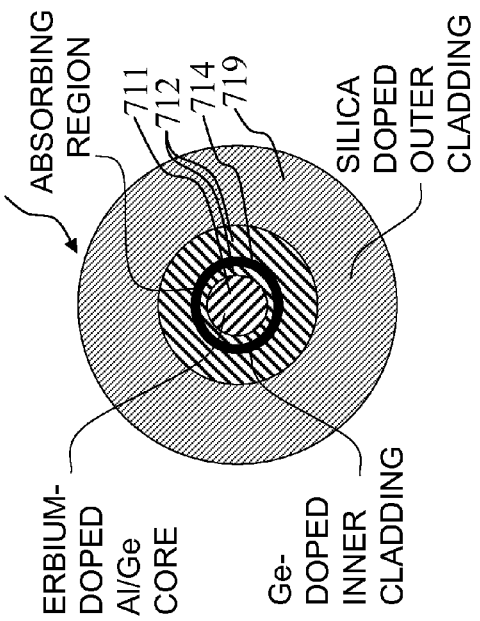
FIG. 8B is a schematic cross-section diagram of a fiber 801 corresponding to the index profile graph of FIG. 8A according to some embodiments of the present invention.

FIG. 8A is a schematic graph 800 of the index of refraction across a diameter of a fiber 801 according to some embodiments of the present invention. FIG. 8B is a schematic cross-section diagram of a fiber 801 corresponding to the index profile graph of FIG. 8A according to some embodiments of the present invention. The embodiment of FIGS. 8A/8B is similar to that of FIGS. 5A/5B, except that the optional signal absorbing region (e.g., a lightly Tm-doped annulus 514) is located at or near the outer diameter of erbium-doped Al/Ge core 511, which has a clear demarcation with respect to graded-index inner cladding 512. In some embodiments, a low-index Si-doped outer cladding 519 surrounds a graded-index Ge-doped inner cladding 512, to contain the pump light in the inner cladding 512 and erbium-doped Al/Ge core 511.

Figure 9A:
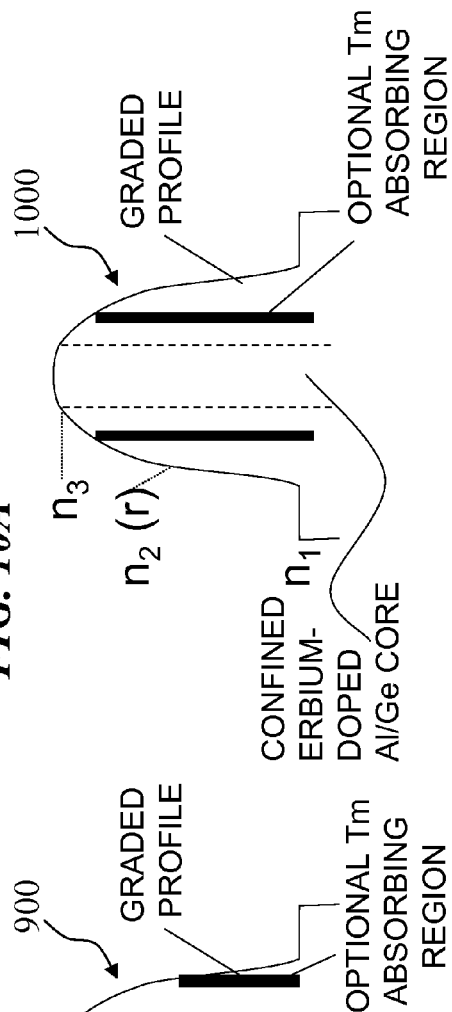
FIG. 9A is a schematic graph 900 of the index of refraction across a diameter of a fiber according to some embodiments of the present invention.
Figure 9B:
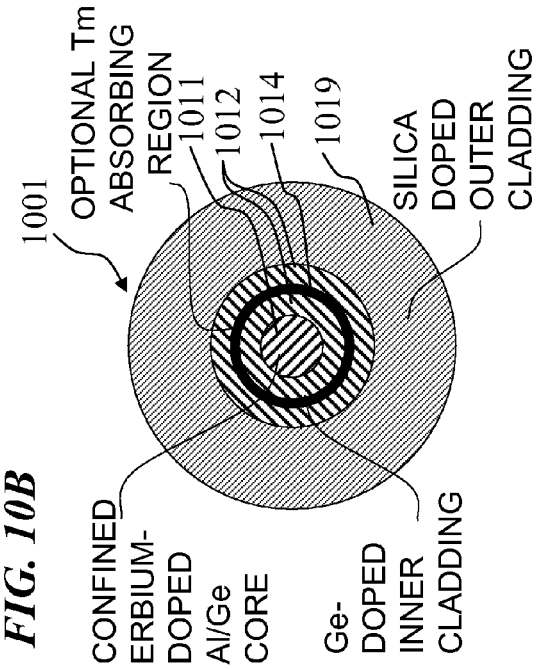
FIG. 9B is a schematic cross-section diagram of a fiber 901 corresponding to the index profile graph of FIG. 9A according to some embodiments of the present invention.

FIG. 9A is a schematic graph 900 of the index of refraction across a diameter of a fiber according to some embodiments of the present invention. FIG. 9B is a schematic cross-section diagram of a fiber 901 corresponding to the index profile graph of FIG. 9A according to some embodiments of the present invention. The embodiment of FIGS. 9A/9B is similar to that of FIGS. 10A/10B, except that the optional signal absorbing region (e.g., a Tm-doped annulus 914) is located at or near the outer diameter of graded-index inner cladding 912 that has no clear demarcation with respect to erbium-doped Al/Ge core 911. In some embodiments, a low-index Si-doped outer cladding 919 surrounds a graded-index Ge-doped inner cladding 912, to contain the pump light in the inner cladding 912 and erbium-doped Al/Ge core 911.

FIG. 10A is a schematic graph 1000 of the index of refraction across a diameter of a fiber 1001 according to some embodiments of the present invention. FIG. 10B is a schematic cross-section diagram of a fiber 1001 corresponding to the index profile graph of FIG. 10A according to some embodiments of the present invention. The embodiment shown in FIG. 10A/10B) is similar to the embodiment of FIG. 1A and FIG. 1B, but has no clear demarcation of core 1011 and inner cladding 1012. A graded profile of inner core 1012 has sufficient index contrast and spatial extent for pump collection, and has a confined dopant substantially covering the region ("the core" 1011) occupied by the structure's lowest-order mode at the signal wavelength. This shows a dispersion-optimized structure for use as a high-peak-power amplifier but where there is no clear demarcation of core and cladding waveguides. In some embodiments, the optional signal absorbing region (e.g., a Tm-doped annulus 1014) is located near the middle of graded-index inner cladding 1012, which has no clear demarcation with respect to erbium-doped Al/Ge core 1011. In some embodiments, a low-index Si-doped outer cladding 1019 surrounds a graded-index Ge-doped inner cladding 1012, to contain the pump light in the inner cladding 1012 and erbium-doped Al/Ge core 1011.

In some embodiments, the present invention includes a singly clad core with a profile similar to that of FIG. 10A, but no Tm doping.

Figure 11A:
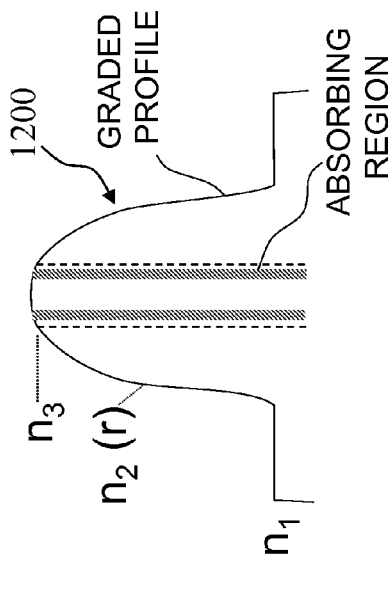
FIG. 11A is a schematic graph 1100 of the index of refraction across a diameter of a fiber according to some embodiments of the present invention.
Figure 11B:
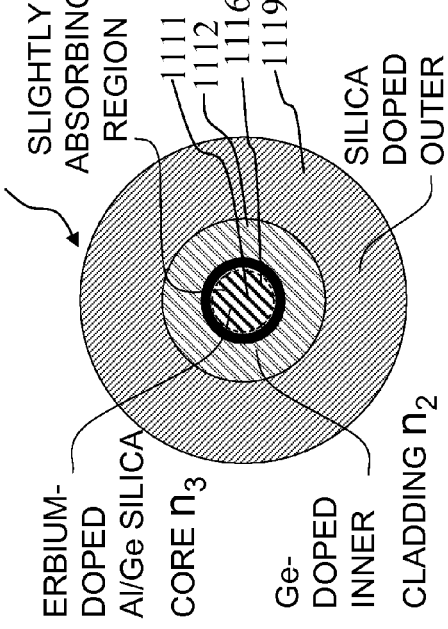
FIG. 11B is a schematic cross-section diagram of a fiber 1101 corresponding to the index profile graph of FIG. 11A according to some embodiments of the present invention.

FIG. 11A is a schematic graph 1100 of the index of refraction across a diameter of a fiber according to some embodiments of the present invention. FIG. 11B is a schematic cross-section diagram of a fiber 1101 corresponding to the index profile graph of FIG. 11A according to some embodiments of the present invention. The embodiment of FIGS. 11A/11B is similar to that of FIGS. 10A/10B, except that the optional signal absorbing region (e.g., a Tm-doped annulus 1114) is located at or near the inner diameter of graded-index inner cladding 1112, which has no clear demarcation with respect to erbium-doped Al/Ge core 1111. In some embodiments, a low-index Si-doped outer cladding 1119 surrounds a graded-index Ge-doped inner cladding 1112, to contain the pump light in the inner cladding 1112 and erbium-doped Al/Ge core 1111.

Figure 12A:
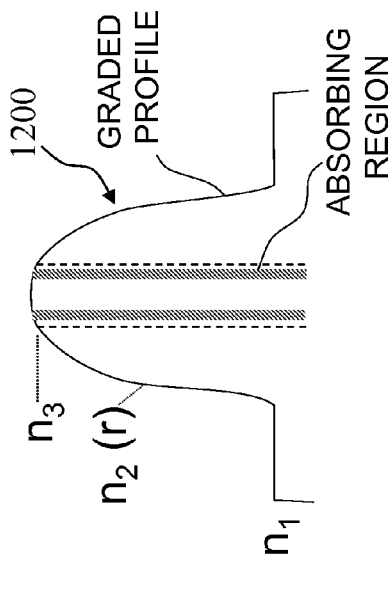
FIG. 12A is a schematic graph 1200 of the index of refraction across a diameter of a fiber according to some embodiments of the present invention.
Figure 12B:
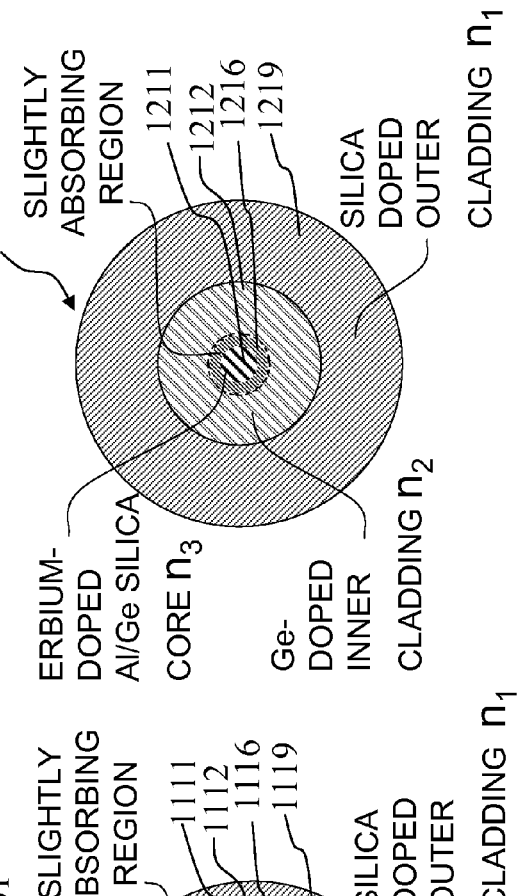
FIG. 12B is a schematic cross-section diagram of a fiber 1201 corresponding to the index profile graph of FIG. 12A according to some embodiments of the present invention.

FIG. 12A is a schematic graph 1200 of the index of refraction across a diameter of a fiber according to some embodiments of the present invention. FIG. 12B is a schematic cross-section diagram of a fiber 1201 corresponding to the index profile graph of FIG. 12A according to some embodiments of the present invention. The embodiment of FIGS. 12A/12B is similar to that of FIGS. 10A/10B, except that the optional signal absorbing region (e.g., a lightly Tm-doped annulus 1214) is located at or near the outer diameter of erbium-doped Al/Ge core 1211, which has no clear demarcation with respect to graded-index inner cladding 1212. In some embodiments, a low-index Si-doped outer cladding 1219 surrounds a graded-index Ge-doped inner cladding 1212, to contain the pump light in the inner cladding 1212 and erbium-doped Al/Ge core 1211.

Figure 13A:
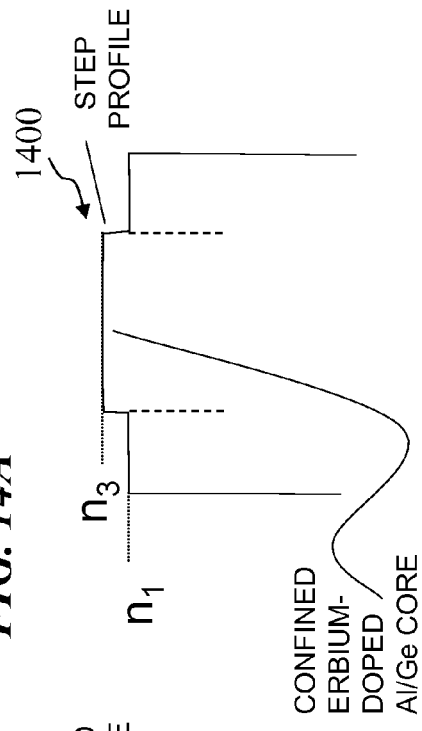
FIG. 13A is a schematic graph 1300 of the index of refraction across a diameter of a fiber according to some embodiments of the present invention.
Figure 13B:
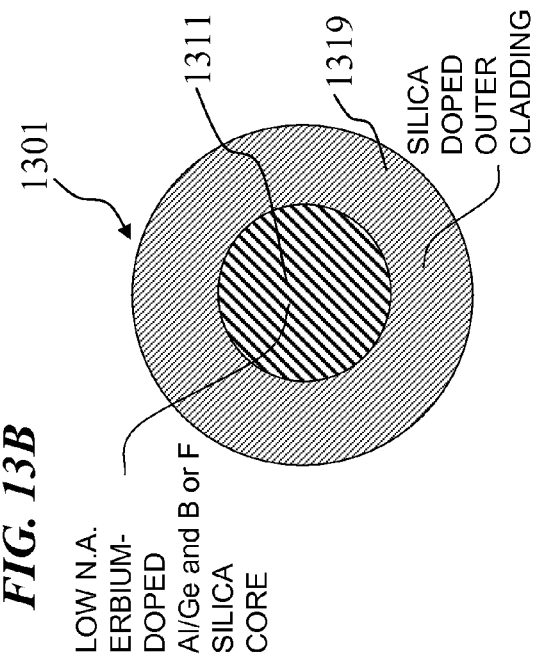
FIG. 13B is a schematic cross-section diagram of a fiber 1301 corresponding to the index profile graph of FIG. 13A according to some embodiments of the present invention.

FIG. 13A is a schematic graph 1300 of the index of refraction across a diameter of a fiber 1301 according to some embodiments of the present invention. FIG. 13B is a schematic cross-section diagram of a fiber 1301 corresponding to the index profile graph of FIG. 13A according to some embodiments of the present invention. The embodiment of FIGS. 13A/13B is similar to that of FIGS. 10A/10B, except that the optional signal absorbing is omitted, the diameter of erbium-doped Al/Ge-doped silica core 1311 (or, in other embodiments, a erbium-doped germanium-doped silica core) is larger, and there is only a single cladding, which is useful for core-pumped fiber lasers and amplifiers. In some embodiments, a low-index Si-doped outer cladding 1319 surrounds the graded-index core 1311, to contain the pump light and signal light in the core 1311. In other embodiments, a low-index fluorosilicate or low-index polymer outer cladding is used for cladding 1319. In some embodiments, the core 1311 has a low NA (in order to obtain a large mode area that supports only a single mode) obtained by lowering the index of the core (e.g., by doping with boron and/or fluorine) and/or by raising the index of the cladding 1319 (e.g., by doping with germania).

Figure 14A:
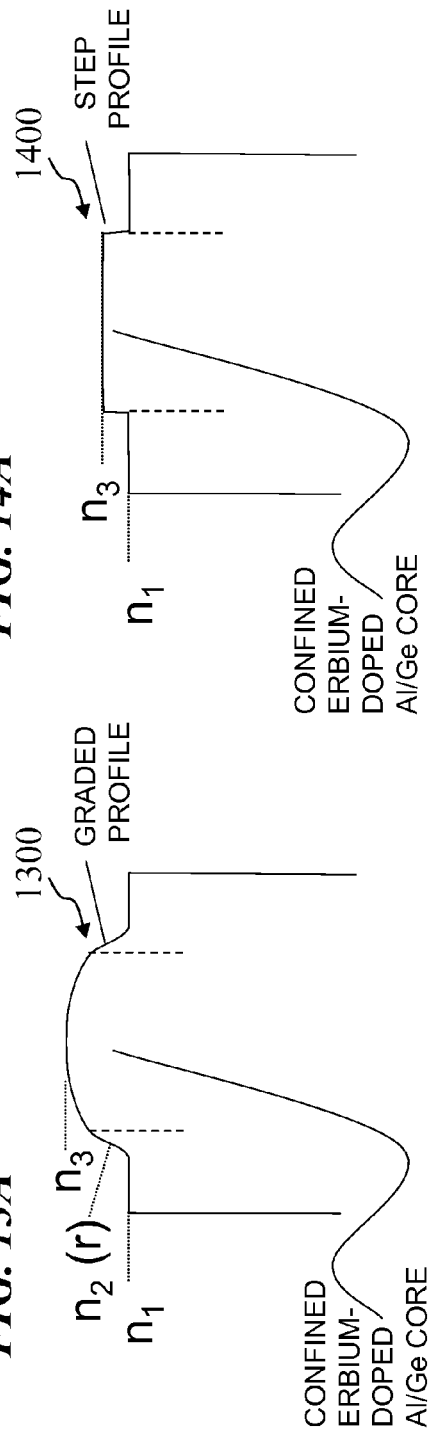
FIG. 14A is a schematic graph 1400 of the index of refraction across a diameter of a fiber according to some embodiments of the present invention.
Figure 14B:
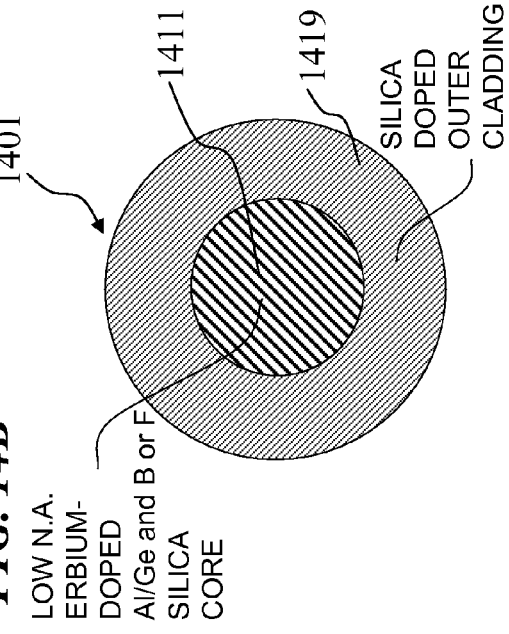
FIG. 14B is a schematic cross-section diagram of a fiber 1401 corresponding to the index profile graph of FIG. 14A according to some embodiments of the present invention.

FIG. 14A is a schematic graph 1400 of the index of refraction across a diameter of a fiber 1401 according to some embodiments of the present invention. FIG. 14B is a schematic cross-section diagram of a fiber 1401 corresponding to the index profile graph of FIG. 14A according to some embodiments of the present invention. The embodiment of FIGS. 14A/14B is similar to that of FIGS. 14A/14B, except that erbium-doped Al/Ge-doped silica core 1411 (or, in other embodiments, an erbium-doped germanium-doped silica core) has a step profile, and again there is only a single cladding, which is useful for core-pumped fiber lasers and amplifiers. In some embodiments, a low-index Si-doped outer cladding 1419 surrounds the graded-index core 1411, to contain the pump light and signal light in the core 1411. In other embodiments, a low-index fluorosilicate or low-index polymer outer cladding is used for cladding 1419. In some embodiments, the core 1411 has a low NA (in order to obtain a large mode area that supports only a single mode) obtained by lowering the index of the core (e.g., by doping with boron and/or fluorine) and/or by raising the index of the cladding 1419 (e.g., by doping with germania).

In some embodiments, the doping of the core includes 15-30 mol % Ge, 2-15 mol % Al, and/or sufficient fluorine and/or boron to reduce the index of refraction. In some embodiments, a sufficient amount of phosphorous is added to stabilize the glass.

In some embodiments, the value for the core $NA=(n_3-n_2)^2$ is made to be between about 0.04 and about 0.15. In some embodiments, the core $NA=(n_3-n_2)^2$ is made to be between about 0.01 and about 0.02. In some embodiments, the core $NA=(n_3-n_2)^2$ is made to be between about 0.02 and about 0.03. In some embodiments, the core $NA=(n_3-n_2)^2$ is made to be between about 0.03 and about 0.04. In some embodiments, the core $NA=(n_3-n_2)^2$ is made to be between about 0.04 and about 0.05. In some embodiments, the core $NA=(n_3-n_2)^2$ is made to be between about 0.05 and about 0.06. In some embodiments, the core $NA=(n_3-n_2)^2$ is made to be between about 0.06 and about 0.07. In some embodiments, the core $NA=(n_3-n_2)^2$ is made to be between about 0.07 and about 0.08. In some embodiments, the core $NA=(n_3-n_2)^2$ is made to be between about 0.08 and about 0.09. In some embodiments, the core $NA=(n_3-n_2)^2$ is made to be between about 0.09 and about 0.10. In some embodiments, the core $NA=(n_3-n_2)^2$ is made to be between about 0.10 and about 0.11. In some embodiments, the core $NA=(n_3-n_2)^2$ is made to be between about 0.11 and about 0.12. In some embodiments, the core $NA=(n_3-n_2)^2$ is made to be between about 0.12 and about 0.13. In some embodiments, the core $NA=(n_3-n_2)^2$ is made to be between about 0.13 and about 0.14. In some embodiments, the core $NA=(n_3-n_2)^2$ is made to be between about 0.14 and about 0.15. In some embodiments, the core $NA=(n_3-n_2)^2$ is made to be between about 0.15 and about 0.16. In some embodiments, the core $NA=(n_3-n_2)^2$ is made to be between about 0.16 and about 0.17. In some embodiments, the core $NA=(n_3-n_2)^2$ is made to be between about 0.17 and about 0.18. In some embodiments, the core $NA=(n_3-n_2)^2$ is made to be between about 0.18 and about 0.19. In some embodiments, the core $NA=(n_3-n_2)^2$ is made to be between about 0.19 and about 0.20. In some embodiments, the core $NA=(n_3-n_2)^2$ is made to be between about 0.20 and about 0.21. In some embodiments, the core $NA=(n_3-n_2)^2$ is made to be within two or more groups of the above ranges.

In some embodiments, the value for the inner cladding $NA=(n_2-n_1)^2$ is made to be between about 0.15 and about 0.25. In some embodiments, the inner cladding $NA=(n_2-n_1)^2$ is made to be between about 0.10 and about 0.11. In some embodiments, the inner cladding $NA=(n_2-n_1)^2$ is made to be between about 0.11 and about 0.12. In some embodiments, the inner cladding $NA=(n_2-n_1)^2$ is made to be between about 0.12 and about 0.13. In some embodiments, the inner cladding $NA=(n_2-n_1)^2$ is made to be between about 0.13 and about 0.14. In some embodiments, the inner cladding $NA=(n_2-n_1)^2$ is made to be between about 0.14 and about 0.15. In some embodiments, the inner cladding $NA=(n_2-n_1)^2$ is made to be between about 0.15 and about 0.16. In some embodiments, the inner cladding $NA=(n_2-n_1)^2$ is made to be between about 0.16 and about 0.17. In some embodiments, the inner cladding $NA=(n_2-n_1)^2$ is made to be between about 0.17 and about 0.18. In some embodiments, the inner cladding $NA=(n_2-n_1)^2$ is made to be between about 0.18 and about 0.19. In some embodiments, the inner cladding $NA=(n_2-n_1)^2$ is made to be between about 0.19 and about 0.20. In some embodiments, the inner cladding $NA=(n_2-n_1)^2$ is made to be between about 0.20 and about 0.21. In some embodiments, the inner cladding $NA=(n_2-n_1)^2$ is made to be between about 0.21 and about 0.22. In some embodiments, the inner cladding $NA=(n_2-n_1)^2$ is made to be between about 0.22 and about 0.23. In some embodiments, the inner cladding $NA=(n_2-n_1)^2$ is made to be between about 0.23 and about 0.24. In some embodiments, the inner cladding $NA=(n_2-n_1)^2$ is made to be between about 0.24 and about 0.25. In some embodiments, the inner cladding $NA=(n_2-n_1)^2$ is made to be between about 0.25 and about 0.26. In some embodiments, the inner cladding $NA=(n_2-n_1)^2$ is made to be between about 0.26 and about 0.27. In some embodiments, the inner cladding $NA=(n_2-n_1)^2$ is made to be between about 0.27 and about 0.28. In some embodiments, the inner cladding $NA=(n_2-n_1)^2$ is made to be between about 0.28 and about 0.29. In some embodiments, the inner cladding $NA=(n_2-n_1)^2$ is made to be between about 0.29 and about 0.30.

In some embodiments, the inner cladding $NA=(n_2-n_1)^2$ is made to be between about 0.30 and about 0.35. In some embodiments, the inner cladding $NA=(n_2-n_1)^2$ is made to be between about 0.35 and about 0.40. In some embodiments, the inner cladding $NA=(n_2-n_1)^2$ is made to be between about 0.40 and about 0.45. In some embodiments, the inner cladding $NA=(n_2-n_1)^2$ is made to be between about 0.45 and about 0.50. In some embodiments, the inner cladding $NA=(n_2-n_1)^2$ is made to be between about 0.50 and about 0.55. In some embodiments, the inner cladding $NA=(n_2-n_1)^2$ is made to be between about 0.55 and about 0.60. In some embodiments, the inner cladding $NA=(n_2-n_1)^2$ is made to be between about 0.60 and about 0.65. In some embodiments, the inner cladding $NA=(n_2-n_1)^2$ is made to be between about 0.65 and about 0.70. In some embodiments, the inner cladding $NA=(n_2-n_1)^2$ is made to be between about 0.70 and about 0.75. In some embodiments, the inner cladding $NA=(n_2-n_1)^2$ is made to be between about 0.75 and about 0.80. In some embodiments, the inner cladding $NA=(n_2-n_1)^2$ is made to be between about 0.80 and about 0.85. In some embodiments, the inner cladding $NA=(n_2-n_1)^2$ is made to be between about 0.85 and about 0.90. In some embodiments, the inner cladding $NA=(n_2-n_1)^2$ is made to be between about 0.90 and about 0.95. In some embodiments, the inner cladding $NA=(n_2-n_1)^2$ is made to be between about 0.95 and about 1. In some embodiments, the fiber is formed to have its core $NA=(n_3-n_2)^2$ made to be within the above ranges for core NA, in combination with its inner cladding $NA=(n_2-n_1)^2$ made to be within the above ranges for inner cladding NA.

In some embodiments, the dispersion of the core is controlled by doping the silica core with aluminum and germanium to move the $lambda_0$ of the core to a longer wavelength than the signal wavelength (e.g., by an amount of Al/Ge doping to obtain a $lambda_0$ of about 1.6-1.65 microns for a signal wavelength in the range of 1.5 to 1.6 microns), in order to reduce the dispersion of the signal wavelength. This Al/Ge doping for dispersion control increases the index-of-refraction of the core, which would increase the NA of the core, so some embodiments the NA of the core is modified by adding an index-reducing dopant (such as fluorine or boron) to the core and/or adding an index-raising dopant (such as germanium) to the inner cladding.

In some embodiments, the invention provides a gain fiber for an optical fiber amplifier for pulses in the 1.52- to 1.62-micron wavelength range in which the fundamental mode experiences normal dispersion when passing through the gain medium.

In some embodiments, the gain section includes a single-clad erbium fiber, wherein pump light is launched directly into the core. In some embodiments, the gain section includes a multi-clad (i.e., a fiber having a plurality of cladding layers, wherein in some embodiments these are concentric layers surrounding the core) fiber having at least a core, and inner cladding, and an outer cladding. In some embodiments, the gain section includes a double-clad erbium fiber. In other embodiments, the gain section includes a triple-clad erbium fiber. In yet other embodiments, other numbers of cladding layers are used.

In some embodiments, the gain section includes a multi-clad fiber fabricated by a method that includes raising the index of the inner cladding.

In some embodiments, the raised-index inner cladding is primarily silicate doped with germanium.

In some embodiments, the core of the fiber is erbium doped and includes germanium and aluminum, and the erbium-doped core has its normal-dispersion property dominated by concentrations of the germanium and the aluminum.

In some embodiments, the fiber has at least three claddings including a coating cladding surrounding the outer cladding, and the inner-cladding-to-outer cladding refractive index profile approximates a step index.

In some embodiments, the inner-cladding-to-outer-cladding refractive index profile approximates a step index. In some embodiments, the inner cladding-to-outer-cladding refractive index has a graded profile.

In some embodiments, the inner cladding has a region doped with thulium and positioned for cladding-mode absorption.

In some embodiments, the inner cladding has a numerical aperture in the range 0.15-0.35. In some embodiments, the inner cladding has a numerical aperture in the range 0.20-0.35.

In some embodiments, the core has a numerical aperture in the range 0.04 to 0.15.

In some embodiments, the core and cladding refractive indexes vary in a continuous manner so that boundaries between core and cladding regions are ill defined in a refractive index profile. This provides a large multimode fiber with a graded profile and a confined dopant in the "core" region.

In some embodiments, the erbium ions are confined to a region in which the overlap with the LP01 or fundamental mode of the structure is in the range 60%-100%.

In some embodiments, the cladding waveguide is formed by lowering the outer cladding refractive index.

In some embodiments, the core has a numerical aperture in the range 0.15-0.35. In some embodiments, the core has a numerical aperture in the range 0.20-0.35. In some embodiments, the core has a numerical aperture in the range 0.15-0.20. In some embodiments, the core has a numerical aperture in the range 0.20-0.25. In some embodiments, the core has a numerical aperture in the range 0.25-0.30. In some embodiments, the core has a numerical aperture in the range 0.30-0.35.

In some embodiments, the numerical aperture and dispersion properties are dominated (i.e., are primarily defined) by the concentrations of germanium and aluminum in the core.

In some embodiments, the cladding waveguide is formed by a fluorosilicate outer cladding. In some embodiments, the cladding waveguide is formed by a low-index polymer coating.

In some embodiments, the core has aluminum and germanium doping, and the inner cladding has its index raised (e.g., by doping with germanium) and/or the core has its index lowered (e.g., by fluorine or boron doping).

In some embodiments, the outer cladding is formed in one of the manners described above.

Some embodiments further include a thulium doped region positioned to provide substantial loss at the first Raman-gain peak with respect to the signal wavelength, but minimal loss at the signal wavelength itself.

Some embodiments further include a thulium-doped region positioned to provide substantial loss at the first Raman-gain peak with respect to the signal wavelength but minimal loss at the pump wavelength.

In some embodiments, the inner core region is co-doped with fluorine or boron to reduce the index of refraction.

In some embodiments, the core has a step-like index profile with its numerical aperture in the range 0.04 to 0.15.

In some embodiments, the core is co-doped with boron or fluorine to restrict the index difference but still provide normal dispersion via the germania, alumino-content.

In some embodiments, a group of dopants in the inner core ensure normal dispersion while additional dopants lower the refractive index difference by either raising the index of the cladding or lowering the index of the core without otherwise changing the sign of the LP01-mode dispersion.

In some embodiments, the gain section includes at least a core and an inner cladding, wherein a first group of one or more dopants in the core provide normal dispersion while additional dopants in the fiber lower the refractive index difference by either raising the index of the inner cladding or lowering the index of the core without otherwise changing the sign of the LP01-mode dispersion.

In some embodiments, the core is directly pumped by a high-brightness pump source.

In some embodiments, the core and cladding are formed by in one of the manners described above, and the core is directly pumped by a high brightness pump source such as a solid-state laser (e.g., a crystal laser having a gain medium that includes ytterbium-doped yttrium aluminum garnet (Yb:YAG), yttrium vanadate (Yb:YVO$_4$), potassium tungstates (Yb:KGd(WO$_4$)$_2$ and Yb:KY(WO$_4$)$_2$, also called Yb:KGW and Yb:KYW), strontium yttrium silicate (Yb:SYS), various borates (Yb:BOYS, Yb:GdCOB), apatites (Yb:Sr5(PO$_4$)$_3$F=Yb:S—FAP, Yb:SYS), sesquioxides, calcium fluoride (Yb:CaF$_2$), and in various glasses (Yb:glass, e.g., based on silicate or phosphate glasses; also used in optical fibers), semiconductor (e.g., an optically-pumped semiconductor laser ("OPSL")) or fiber laser. In some such embodiments, the fiber is a single-clad fiber, since the pump light is launched directly into the core.

In some embodiments, the pump source includes an Yb fiber laser operating in the range 950 nm to 1020 nm. In some embodiments, this pump source operates in a preferred range of 970 nm-990 nm.

In some embodiments, the pump source is a fiber Raman laser operating in the range 1460 nm-1550 nm. In some embodiments, this pump source operates in a preferred range of 1470-1490 nm.

In some embodiments, the pump source is a Thulium fiber laser operating in the range 1460-1530 nm. In some embodiments, this pump source operates in a preferred range of 1480-1500 nm.

In some embodiments, the pump source is an erbium fiber laser operating in the range 1480-1565 nm. In some embodiments, this pump source operates in a preferred range of 1480-1510 nm.

In some embodiments, the present invention provides a method for amplifying optical pulses in the 1.52-1.62 microns wavelength range. The method includes providing a fiber having gain medium; and amplifying an optical signal in the gain medium such that the fundamental mode experiences normal dispersion when passing through the gain medium.

In some embodiments of the method, the fiber includes a multi-clad fiber having at least a core, and inner cladding, and an outer cladding, the method further comprising launching pump light into the inner cladding such that from the inner cladding the pump light enters the core along the core's length. In some such embodiments, the inner cladding includes germanium, wherein the core is erbium doped and includes germanium and aluminum, and wherein the erbium-doped core has its normal dispersion property dominated by concentrations of the germanium and the aluminum. In some such embodiments, the fiber has at least three claddings including a coating cladding surrounding the outer cladding, and the inner-cladding-to-outer cladding refractive index profile approximates a step index.

In some embodiments of the method, the inner cladding refractive index has a graded profile.

In some embodiments of the method, the inner cladding also has a region doped with thulium for cladding-mode absorption.

In some embodiments of the method, the core and cladding indexes vary in a continuous manner so that the boundaries of the core and cladding regions are ill defined in a refractive index profile.

In some embodiments of the method, the fiber further includes a thulium-doped region positioned to provide substantial loss at the first Raman-gain peak with respect to the signal wavelength but minimal loss at the signal wavelength itself.

In some embodiments of the method, the core region is co-doped with at least one of fluorine and boron to reduce the index of refraction.

In some embodiments of the method, the gain section includes at least a core and an inner cladding, wherein a first group of one or more dopants in the core provide normal dispersion while additional dopants in the fiber lower the refractive index difference by either raising the index of the inner cladding or lowering the index of the core without otherwise changing the sign of the LP01-mode dispersion.

In some embodiments, the present invention provides an apparatus for amplifying optical pulses in the 1.52-1.62 microns wavelength range, the apparatus including a fiber having gain medium; and means for amplifying an optical signal in the gain medium such that the fundamental mode experiences normal dispersion when passing through the gain medium.

In some embodiments of the apparatus, the means for amplifying includes a multi-clad fiber having at least a core, and inner cladding, and an outer cladding, and the inner cladding includes germanium, wherein the core is erbium doped and includes germanium and aluminum, and wherein the erbium-doped core has its normal dispersion property dominated by concentrations of the germanium and the aluminum.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for amplifying optical signal pulses in the 1.52-1.62 microns wavelength range, the method comprising:
providing a fiber having a large-mode-area core that includes germanium and aluminum, wherein the large-mode-area core has a diameter of between 10 microns and 50 microns and is surrounded by a plurality of cladding layers including an inner cladding having a diameter that is larger than the diameter of the core, and wherein a zero-dispersion wavelength of the core is longer than the wavelength of the signal pulses such that the wavelength range of the signal pulses is within a normal-dispersion wavelength range that is dominated by concentrations of the germanium and the aluminum; and amplifying the optical signal pulses in the large-mode-area core such that a fundamental mode of the optical signal pulses experiences normal dispersion when passing through the large-mode-area core.

2. The method of claim 1, wherein the fiber includes a multi-clad fiber having at least the large-mode-area core, the inner cladding, and an outer cladding, the method further comprising launching pump light into the inner cladding such that from the inner cladding the pump light enters the core along the core's length.

3. A method for amplifying optical signal pulses in the 1.52-1.62 microns wavelength range, the method comprising:
providing a multi-clad fiber having a large-mode-area core that includes germanium and aluminum, wherein the large-mode-area core has a diameter of between 10 microns and 50 microns and is surrounded by at least a plurality of cladding layers including an inner cladding having a diameter that is larger than the diameter of the core and an outer cladding surrounding the inner cladding, and wherein a zero-dispersion wavelength of the core is longer than the wavelength of the signal pulses such that the wavelength range of the signal pulses is within a normal-dispersion wavelength range that is dominated by concentrations of the germanium and the aluminum;

amplifying the optical signal pulses in the large-mode-area core such that a fundamental mode of the optical signal pulses experiences normal dispersion when passing through the large-mode-area core; and launching pump light into the inner cladding such that from the inner cladding the pump light enters the core along the core's length, wherein the inner cladding includes germanium, and wherein the core is erbium doped.

4. The method of claim 3, wherein the fiber has at least three claddings including a coating cladding surrounding the outer cladding, and the inner-cladding-to-outer cladding refractive index profile approximates a step index.

5. The method of claim 3, wherein the inner cladding refractive index has a graded profile.

6. The method of claim 3, wherein the inner cladding also has a region doped with thulium for cladding-mode absorption.

7. The method of claim 3, wherein the core and cladding indexes vary in a continuous manner so that the boundaries of the core and cladding regions are ill defined in a refractive index profile.

8. A method for amplifying optical signal pulses in the 1.52-1.62 microns wavelength range, the method comprising:
providing a fiber having a large-mode-area core that includes germanium and aluminum, wherein the large-mode-area core has a diameter of between 10 microns and 50 microns and is surrounded by a plurality of cladding layers including an inner cladding having a diameter that is larger than the diameter of the core, and wherein a zero-dispersion wavelength of the core is longer than the wavelength of the signal pulses such that the wavelength range of the signal pulses is within a normal-dispersion wavelength range that is dominated by concentrations of the germanium and the aluminum; and amplifying the optical signal pulses in the large-mode-area core such that a fundamental mode of the optical signal pulses experiences normal dispersion when passing through the large-mode-area core, wherein the fiber further includes a thulium-doped region positioned to provide substantial loss at the first Raman-gain peak with respect to the signal wavelength but minimal loss at the signal wavelength itself.

9. The method of claim 3, wherein the core region is co-doped with at least one of fluorine and boron to reduce the index of refraction.

10. The method of claim 1, wherein the gain section includes at least a core and an inner cladding, wherein a first group of one or more dopants in the core provide normal dispersion while additional dopants in the fiber lower the refractive index difference by either raising the index of the inner cladding or lowering the index of the core without otherwise changing the sign of the LP01-mode dispersion.

11. An apparatus comprising:
an optical fiber amplifier for pulses in the 1.52-1.62 microns wavelength range, wherein the amplifier includes a fiber gain section having a gain medium having a large-mode-area core that includes germanium and aluminum, wherein the large-mode-area core has a diameter of between 10 microns and 50 microns and is surrounded by a plurality of cladding layers including an inner cladding having a diameter that is larger than the diameter of the core, and wherein a zero-dispersion wavelength of the core is longer than the wavelength of the signal pulses such that the wavelength range of the signal pulses is within a normal-dispersion wavelength range that is dominated by concentrations of the germanium and the aluminum and a fundamental-mode pulsed optical signal experiences normal dispersion when passing through the gain medium.

12. The apparatus of claim 11, wherein the gain section includes a multi-clad fiber having at least a core, and inner cladding, and an outer cladding.

13. The apparatus of claim 11, further including a thulium-doped region positioned to provide substantial loss at the first Raman-gain peak with respect to the signal wavelength but minimal loss at the signal wavelength itself.

14. The apparatus of claim 11, wherein the gain section includes at least a core and an inner cladding, wherein a first group of one or more dopants in the core provide normal dispersion while additional dopants in the fiber lower the refractive index difference by either raising the index of the inner cladding or lowering the index of the core without otherwise changing the sign of the LP01-mode dispersion.

15. An apparatus comprising:
an optical fiber amplifier for pulses in the 1.52-1.62 microns wavelength range, wherein the amplifier includes a fiber gain section having a gain medium having a large-mode-area core that includes germanium and aluminum, wherein the large-mode-area core has a diameter of between 10 microns and 50 microns and is surrounded by at least a plurality of cladding layers including an inner cladding having a diameter that is larger than the diameter of the core and an outer cladding surrounding the inner cladding, and wherein a zero-dispersion wavelength of the core is longer than the wavelength of the signal pulses such that the wavelength range of the signal pulses is within a normal-dispersion wavelength range that is dominated by concentrations of the germanium and the aluminum and a fundamental-mode pulsed optical signal experiences normal dispersion when passing through the gain medium, wherein the inner cladding includes germanium, wherein the core is erbium doped and includes germanium and aluminum, and wherein the erbium-doped core has its normal dispersion property dominated by concentrations of the germanium and the aluminum.

16. The apparatus of claim 15, wherein the fiber has at least three claddings including a coating cladding surrounding the outer cladding, and the inner-cladding-to-outer cladding refractive index profile approximates a step index.

17. The apparatus of claim 15, wherein the inner cladding refractive index has a graded profile.

18. The apparatus of claim 15, wherein the inner cladding also has a region doped with thulium for cladding-mode absorption.

19. The apparatus of claim 15, wherein the core and cladding indexes vary in a continuous manner so that the boundaries of the core and cladding regions are ill defined in a refractive index profile.

20. The apparatus of claim 15, wherein the core region is co-doped with at least one of fluorine and boron to reduce the index of refraction.

21. An apparatus for amplifying optical pulses in the 1.52-1.62 microns wavelength range, the apparatus comprising:
a fiber having a gain medium waveguide that includes germanium and aluminum and has a diameter of between 10 microns and 50 microns and is surrounded by a plurality of cladding layers including an inner cladding having a diameter that is larger than the diameter of the core and an outer cladding surrounding the inner cladding, and wherein a zero-dispersion wavelength of the waveguide is longer than the wavelength of the signal pulses such that the wavelength range of the signal pulses is within a normal-dispersion wavelength range that is dominated by concentrations of the germanium and the aluminum; and
means for amplifying an optical signal in the waveguide such that the fundamental mode experiences normal dispersion when passing through the waveguide.

22. The apparatus of claim 21, wherein the means for amplifying includes a multi-clad fiber having at least a core acting as the waveguide, and the inner cladding includes germanium, wherein the core is erbium doped and includes germanium and aluminum, and wherein the erbium-doped core has its normal dispersion property dominated by the concentrations of the germanium and the aluminum.

* * * * *